3,495,804
DIAPHRAGM-TYPE VALVE
Franz-Josef Müller, Grossbettlingen, and Erich Lang, Beihingen (Neckar), Germany, assignors to Erich Herion, Sen., Stuttgart-Frauenkopf, Germany
Filed Oct. 19, 1967, Ser. No. 676,563
Claims priority, application Germany, Oct. 25, 1966, H 60,853
Int. Cl. F16k *31/12, 7/07*
U.S. Cl. 251—36            12 Claims

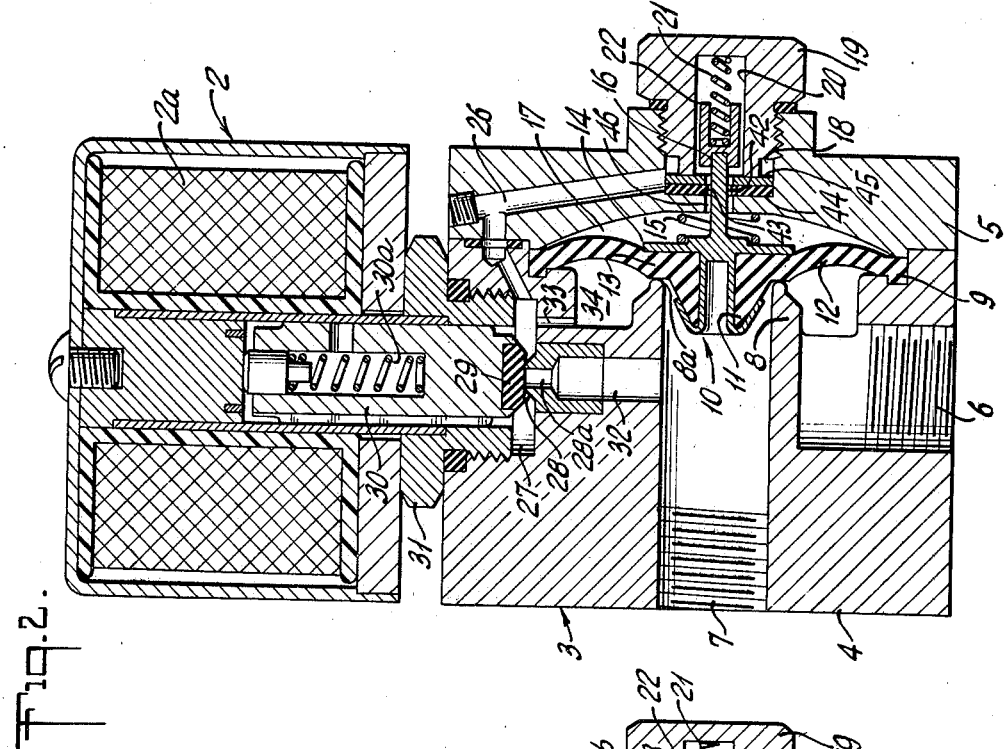
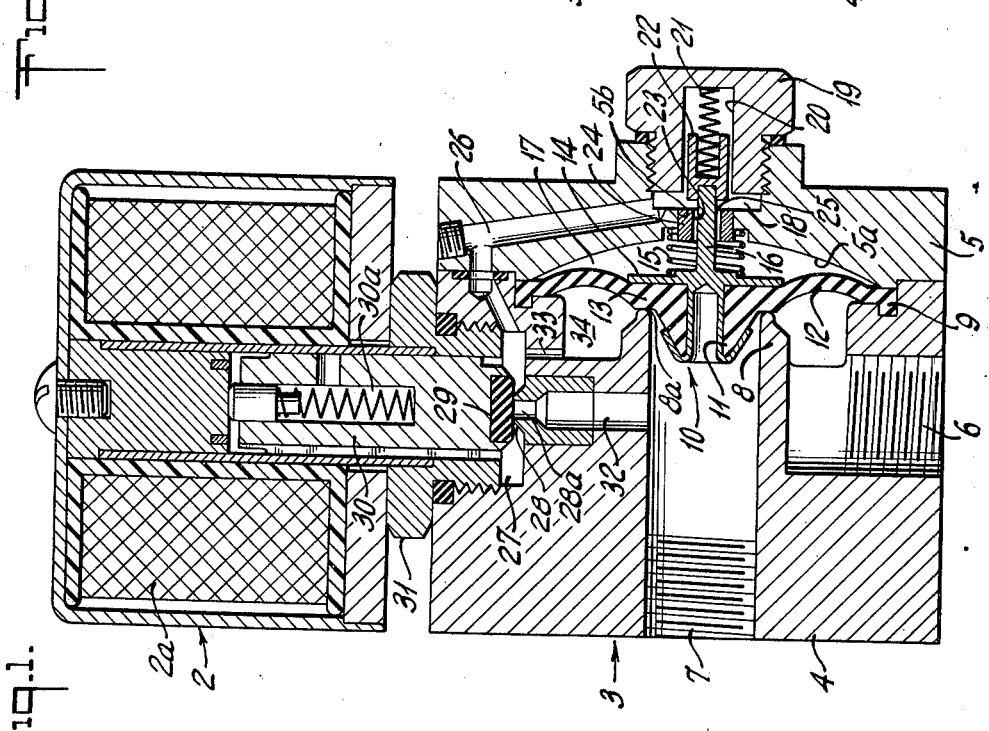

ABSTRACT OF THE DISCLOSURE

A valve system is disclosed with a main diaphragm-type valve and a pilot valve controlling the outlet of the main valve. The diaphragm closing member of the main valve has connected thereto an extension which extends into a bypass between the fluid inlet of the main valve and the back side of the diaphragm to form with the bypass an annular throttle, the extension preventing said throttle from becoming clogged by foreign particles due to its movement with the diaphragm during each opening and closing movement of the valve.

BACKGROUND OF THE INVENTION

The present invention relates to a pressure-medium operable diaphragm-type valve which is actuated by an auxiliary or pilot valve. The diaphragm-type valve is equipped with a diaphragm portion designed as a valve closing member and controlling the fluid outlet of the valve, and is also equipped with an annular surface continuously subjected to the inlet pressure of the pressure medium, with the annular surface being arranged in the same direction as said valve closing member. The diaphragm-type valve furthermore includes a diaphragm rear portion subjected continuously to the pressure of the pressure-medium via a throttle, which pressure is further reduced by the fact that the auxiliary valve has a larger cross-section.

Such valves are generally known. However, they have the drawback that the throttle becomes very easily soiled or clogged by foreign bodies, as for instance dust particles, dirt, metal shavings, slime or the like, so that the valve does not operate properly.

It is one of the objects of the present invention to overcome the above mentioned drawbacks of the heretofore known diaphragm-type valves with a throttle.

It is another object of the present invention to provide a diaphragm-type valve, in which the operation of the valve is completely free from disturbances due to a soiling of the throttle of the valve.

It is still another object of the present invention to provide a diaphragm-type valve with an improved throttle, the outer dimensions of the valve not being increased over heretofore known valves of this type.

These and other objects and advantages of the invention will appear more clearly from the following specification in connection with the accompanying drawings, in which;

FIG. 1 is a cross-section through a valve designed in conformity with the present invention;

FIG. 2 shows an arrangement slightly modified over that of FIG. 1.

SUMMARY OF THE INVENTION

The problem underlying the present invention has been solved by a diaphragm-type valve in which the throttle is designed as an annular passage between the wall of a bore and the outer circumferential surface of a cylindrical push rod connected to the diaphragm and extending axially into the bore.

In conformity with a modified arrangement according to the present invention, the throttle may serve as a means for cushioning or damping the movements of the diaphragm since the push rod may be employed for actuating a piston-like cushioning or damping member. The movements of the push rod in the bore, which is preferably confined by an elastic sleeve or disc, are not always uniform, i.e. during its operation the push rod engages the circumferential surface of the bore at different places and thereby keeps the throttle passage free of dirt and foreign bodies and prevents the accumulation thereof along the circumferential wall of the bore.

DETAILED DESCRIPTION OF PREFERRED EMBODIMENTS

Referring now to the drawing in detail, and FIG. 1 thereof in particular, the valve shown therein comprises an electromechanically operable auxiliary or pilot valve 2 and a diaphragm-type valve 3. The diaphragm-type valve 3 comprises a valve housing composed of a main housing body 4 and a lid 5. Main housing body 4 has a fluid inlet 6 and a substantially horizontally extending fluid outlet 7 arranged at right angles with regard to fluid inlet 6. Main valve housing body 4 is equipped with an annular sleeve-like extension 8 forming the valve seat of diaphragm valve 3. Valve 3 is provided with a diaphragm 10 a marginal portion 9 of which is clamped between the main housing body 4 and lid 5. The central portion of diaphragm 10 forms a valve closing member 11 while the remaining portion 12 between the central portion and the marginal portion 9 faces in the same direction as said valve closing member. It is, of course, to be understood that the valve closing member could form a separate part connected to the annular surface 12 by any suitable means.

A rear portion 13 of diaphragm 10 carries in the center thereof a spring disc 14 which is engaged by one end of a spring 15 the other end of which engages the interior surface of lid 5. A pressure chamber 17 of valve 3 is formed between the rear portion 13 of diaphragm 10 and the inner surface 5a of lid 5. Spring disc 14 has connected thereto a cylindrical push rod 16 which extends through a bore 5b into a chamber 18 in lid 5. Chamber 18 is closed with respect to the outside by a cap-shaped screw 19 which is equipped with a pocket bore 20. This bore receives a spring 21 which acts upon a piston-shaped member 22 serving as a cushioning member for push rod 16.

A bushing or sleeve 24 is inserted into bore 5b of lid 5 and is provided with a longitudinal bore 23. A narrow annular gap 25 is formed between the outer cylindrical circumferential surface of push rod 16 and the inner circumferential wall surface of bushing 24 so as to form a throttle.

Chamber 18 communicates with a chamber 27 in valve 3 via a channel 26. Chamber 27 surrounds a valve seat 28 of the auxiliary valve 2 which is inserted into the main valve housing body 4 of diaphragm valve 3. Valve seat 28 cooperates with a valve closing member 29 of the pilot or auxiliary valve 2, which valve closing member 29 is connected to the magnetic armature 30 of auxiliary valve 2 and is subjected to the force of a spring 30a. The auxiliary valve 2 is equipped with a hollow screw 31 which is threaded into valve housing body 4 to partly confine the valve chamber 27. Valve seat 28 is formed as a sleeve inserted into a channel 32 which leads to inlet 7. A narrow passage 33 leads from a chamber 34 surrounding the extension or valve seat 8 of the main or diaphragm valve 3 to the valve chamber 27 and serves for continuously supplying the fluid pressure medium from inlet 6 to the rear portion 13 of diaphragm 10. Passage 33 has a smaller cross section than the passage 28a in valve seat 28.

The valve arrangement of FIG. 1 operates as follows: In the position shown in FIG. 1, auxiliary valve 2 is closed. The inlet pressure of the fluid medium in the main valve acts through inlet 6, chamber 34, bore 33, passage 26, chamber 18 and annular passage 25 onto the portion 13 of diaphragm 10 and supported by the force of spring 15 presses diaphragm 10 tightly onto the valve seat formed by the annular extension 8. Consequently, valve 3 is closed.

When the electromagnet 2a of the auxiliary valve 2 is energized, the electromagnet attracts armature 30 so that valve closing member 29 is lifted off valve seat 28. The pressure prevailing in pressure chamber 17 will be reduced slowly due to the fact that fluid flows from chamber 17 through annular passage 25 slowly into chamber 18 and from there via channel 26, chamber 27, valve 28 and passage 32 to valve outlet 7. This is due to the fact that the cross section of passage 33 is smaller than that of passage 28a so that less fluid enters chamber 27 than can flow off through passage 28a. Thereupon the pressure in inlet chamber 34 acting on the annular diaphragm surface 12 exceeds the pressure in chamber 17 so that the valve closing member 11 of diaphragm 10 is lifted off its seat 8 against the force of spring 15. Thus, the fluid may flow through passage 8a into outlet 7.

When electromagnet 2a is again de-energized, armature 30 with its valve closing member 29 closes again valve passage 28a of the auxiliary or pilot valve 2. The full inlet pressure will be built up gradually in chamber 17 behind portion 13 of diaphragm 10 with a speed depending on the cross-section of the annular passage or throttle 25, so that finally valve closing member 11 of diaphragm 10 closes passage 8a and rests on the extension 8. In addition to spring 15, also spring 21 acts on diaphragm 10. The tension of spring 21 may be adjusted by turning screw 19 so that the valve closing force can be adjusted very easily from the outside and varied in conformity with the requirements.

Each time the valve is operated, push rod 16 connected to diaphragm 10 will be moved axially within bore 23 of bushing 24 and each time engages a different portion thereof. In this way, the annular passage or gap 25 forming the throttle passage of the valve will be maintained free of dirt and foreign bodies. This is particularly important with valves which are equipped with a very narrow nozzle-shaped throttle passage if a very long reaction period, for instance of several seconds, is required. Even extremely small openings can be maintained clean and free in conformity with the design according to the present invention.

FIG. 2 shows an arrangement slightly modified over that of FIG. 1. The same or similar parts have been designated with the same reference numerals. The arrangement according to FIG. 2 differs from that according to FIG. 1 in that an annular throttle passage 42 is provided between the inner circumferential surface 43 of a disc 44 and the outer circumferential surface of push rod 16. Disc 44 is made of an elastic material, as for instance Teflon or Polysar N made by the Sarnia Corporation or Hycar made by the Goodrich Company. Disc 44 forms one end of chamber 18 and has mounted thereon a pressure piece 45 which is provided with lateral passages for the passage of the fluid. Piece 45 surrounds push rod 16 with a larger play than disc 44. Lid 5 is provided with a bore 46 having a larger diameter than the elastic disc 44 so that push rod 16 passes with larger play through this bore.

Screw 19 closing chamber 18 toward the outside acts on disc 44 via pressure piece 45. Upon turning screw 19 disc 44 is distorted in such a way that its inner diameter is enlarged or decreased. Consequently the cross section of the annular throttle 42 is variable. In all other respects, the valve according to FIG. 2 operates in the same manner as that of FIG. 1.

What is claimed is:

1. In combination: a main valve having a housing with a fluid inlet, a fluid outlet, and a valve seat, valve closing means in said housing and including a diaphragm for selectively establishing and interrupting communication between said inlet and said outlet at said valve seat, extension means connected to said diaphragm for movement therewith, a bypass leading from said inlet to that side of said diaphragm which is remote from said valve seat, said bypass having a first throttling portion adjacent said inlet and having a second throttling portion, a conduit leading from said bypass between said first and second throttling portions to said outlet, and a pilot valve in said conduit for selectively opening and closing the same, said conduit having a cross section wider than said first throttling portion, whereby upon said pilot valve opening said conduit fluid will be discharged from said bypass through said conduit prior to a discharge from said first throttling portion through said conduit, said second throttling portion and said extension means together forming an annular throttle having a cross section independent of movement of said extension means whereby said extension means due to its movement keeps said second throttling portion free of foreign particles.

2. The combination according to claim 1, wherein said main valve includes an insert inserted into said housing and wherein said second throttling portion is provided in said insert in axial alignment with said extension means.

3. The combination of claim 1 wherein said second throttling portion is formed by a sleeve pressed into said housing.

4. The combination of claim 3, wherein said sleeve forms a disc of elastic material pressed into said housing.

5. The combination of claim 4, which includes a pressure member in engagement with said elastic disc, and adjustable means cooperating with said pressure member for adjustably compressing said elastic disc to thereby vary the size of said annular throttle.

6. The combination of claim 5, wherein said adjustable means is formed by a screw inserted into said housing and in engagement with said pressure member.

7. The combination of claim 1, which includes a dish-shaped portion integrally connected with said extension means, and a spring interposed between said housing and said dish-shaped portion and continuously urging said diaphragm toward engagement with said valve seat.

8. The combination of claim 1, which includes a screw threadedly inserted into said housing and a spring interposed between said screw and said extension means for continuously urging said diaphragm towards engagement with said valve seat whereby the spring force of said spring may be varied by varying the extent to which said screw is threaded into said housing.

9. The combination of claim 1 which includes a dashpot for damping the movement of said extension means through said second throttling portion.

10. The combination of claim 9, wherein said dashpot is formed by a member connected to said extension means, a screw inserted into said housing and having a recess, and a spring received in said recess and interposed between said screw and said member.

11. The combination of claim 1 wherein said housing has an aperture in alignment with said extension means, comprising adjusting means threaded into said aperture, and spring means extending between said adjusting means and said extension means, whereby rotation of said adjusting means affects variation in the valve closing force of said main valve.

12. The combination of claim 1 wherein said second throttling portion comprises a disc of elastic material surrounding said extension means, whereby said annular throttle is formed between the inner circumference of said disc and the outer circumference of said extension means, and wherein said combination further comprises adjusting means operable externally of said housing for applying an adjustable axial compressing force on said disc to vary the size of said annular throttle.

References Cited

UNITED STATES PATENTS

| | | | |
|---|---|---|---|
| 1,657,817 | 1/1928 | Cadwell et al. | 251—45 X |
| 2,000,002 | 4/1935 | Stockmeyer | 251—45 |
| 2,235,304 | 3/1941 | Toussaint | 251—45 |
| 3,253,615 | 5/1966 | Armstrong | 251—30 X |

ARNOLD ROSENTHAL, Primary Examiner

U.S. Cl. X.R.

251—30, 45